Sept. 6, 1955
C. J. SIEGEL
2,716,835
ANIMAL TRAP
Filed Sept. 17, 1953
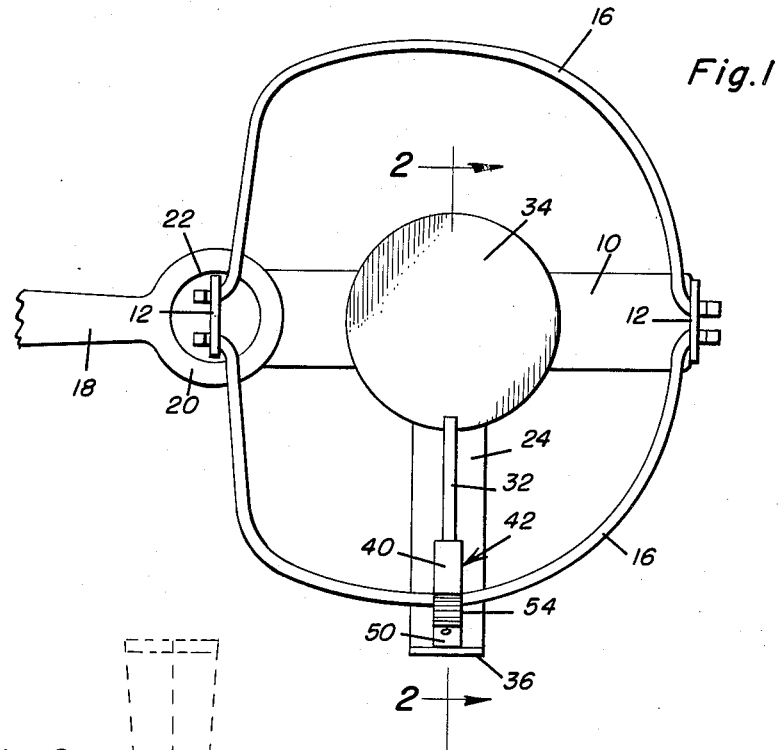
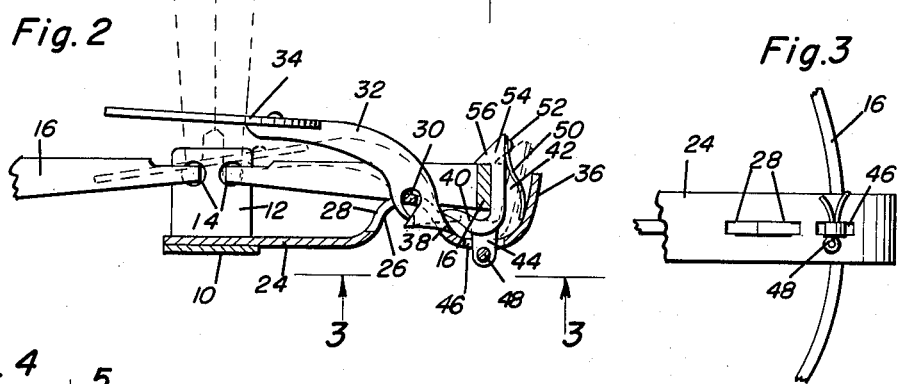
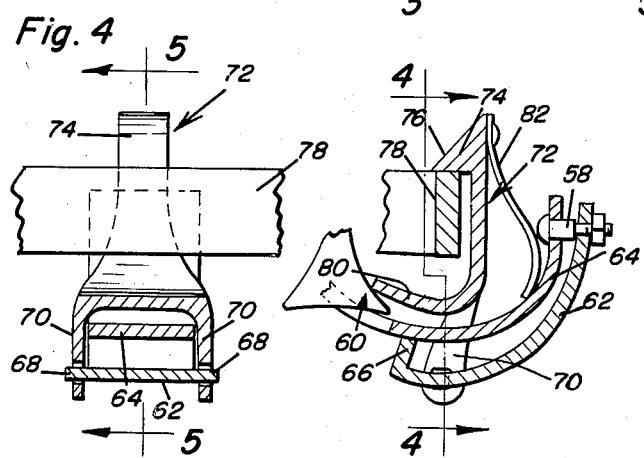
Clarence J. Siegel
INVENTOR.
BY Clarence A. O'Brien
and Harvey B. Jackson
Attorneys

United States Patent Office 2,716,835
Patented Sept. 6, 1955

2,716,835

ANIMAL TRAP

Clarence J. Siegel, Grand Rapids, Mich.

Application September 17, 1953, Serial No. 380,663

2 Claims. (Cl. 43—95)

This invention relates generally to animal traps and pertains more particularly to improvements in the latching or setting mechanism thereof.

In conventional trap constructions, it is well known that it is necessary to exercise considerable effort and that it requires considerable finger dexterity to accomplish the setting inasmuch as it is mandatory, from their construction, to hold the trap base in one hand while urging the jaws to be spread or set in position with the other hand. Simultaneously, it is necessary to pivot the usual latching finger to a position overlying one of the jaws and to engage the free end of this finger with the notch provided in the pivot arm of the trip pan. During this last operation, it is also necessary to relax the manual pressure on the jaws such that the actuating spring will tension the latching finger so as to complete the setting of the trap. It is quite evident that the above procedure is rather involved and requires extensive effort on the user's part. Moreover, the user is never quite certain whether or not the finger will remain properly engaged with the trip pan assembly when pressure is relaxed on the jaws and as frequently occurs, the jaws will spring together and cause injury to the user. Also, since trapping is practiced during the coldest months of the year, extreme discomfort is encountered while setting conventional traps since it is necessary to remove protective mittens or gloves to effectively accomplish the setting.

It is, therefore, a primary object of this invention to provide an improved latching and release mechanism for animal traps which will effectively overcome the above difficulties by effecting an automatic setting of traps in response to depression of the jaws to the spread or set position.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a plan view of a trap in the set position;

Figure 2 is a vertical section taken substantially along the plane of the section line 2—2 in Figure 1 showing details of the improved latch and release mechanism on an enlarged scale;

Figure 3 is a bottom plan view as indicated generally by the section line 3—3 in Figure 2;

Figure 4 is a vertical section taken substantially along the plane of section line 4—4 in Figure 5 showing a modified form of construction; and Figure 5 is a vertical section taken substantially along the plane of section line 5—5 in Figure 4.

Referring now more particularly to Figures 1–3, the trap shown incorporates conventional features inasmuch as it embodies the use of the base member 10 provided with upturned ear portions 12 at its opposite ends which are apertured as at 14 to receive the free ends of the jaw members 16 such that the jaw members may pivot between a spread or set position and a clamping or trapping position in the conventional manner. The assembly also incorporates the usual U-shaped spring means 18 one of whose ends is secured to the base member 10 and the other of which is enlarged as at 20 and provided with an opening 22 for engaging with the corresponding ends of the jaw members to normally urge them to the closed or clamped position, as is well understood in the art. The assembly also incorporates a laterally projecting arm member 24 secured at one end at about the mid-portion of the base member 10 and which is provided with a curved portion 26 provided with a pair of spaced slots 28 presenting a bar portion 30 therebetween and about which one end of the trip arm 32 is crimped such that the arm is pivotable about the bar. The inner end of the arm 32 has a trip pan 34 rigidly affixed thereto and it will be noted that the outer end of the arm 24 is provided with an upturned free end portion 36. All of the above described structure is generally conventional in nature and does not, in itself, form a part of this invention.

However, it is preferred that the embodiment of the trap shown in Figures 1–3 be manufactured as a unit with the component parts thus far described being substantially conventional in nature. One departure from the conventional is that the free end of the arm member 32 is provided with a cam projection or finger 38 which underlies the arcuate portion 40 of the combined latch and release member indicated generally by the reference character 42. This member is of generally J-shaped configuration and is provided with a depending ear member 44 projecting through a slot 46 in the arm 24 adjacent its free end and the extremity of this ear is apertured to receive a cotter pin member 48 to maintain the member 42 in proper position. The generally S-shaped spring 50 is rigidly secured as by rivet 52 to the upper end of the J-shaped member 42 and the opposite end of this spring bears against the inner side of the upturned free end portion 36 of the arm 24 in the manner shown most clearly in Figure 2 such as to normally urge the member 42 to the full line position shown.

The upper end of the member 42 is formed with a laterally projecting nose portion 54 whose upper surface is inclined in the manner shown for a purpose presently apparent.

In operation of the assembly shown in Figures 1–3, it will be manifest that it is merely necessary for the operator to grasp the base 10 in one hand and force the jaw members from the dotted line position shown in Figure 2 to the full line position shown therein, whereupon one of the jaws will engage the inclined surface of the nose and deflect the member 42 to the dotted line position shown until such time as the nose 54 will engage over and overlie the jaw to retain it in the set position. No further operation is necessary to complete the setting of the trap assembly. Obviously, when an animal steps on the trip pan member 34 the cam projection 38 thereon will pivot the member 42 to the dotted line position such as to release the jaws and permit them to assume the clamped or closed position.

Referring now more particularly to Figures 4 and 5, wherein a modified form of construction is shown, the assembly takes the form of an attachment for use on conventional traps such as are already provided on the market. The usual latching finger is removed and a fastening member 58 is inserted in the aperture which was provided in the conventional trap for the reception of the latching finger. The conventional trip pan assembly of the trap is replaced by the trip pan assembly which incorporates a cam projection or finger 60 in the manner shown. The cam projection 60 is provided on a pivoted trip arm having a pan member similar to the pivoted trip arm 32 and pan member 34 of Figs. 1 and 2. A bracket or mounting plate 62 is secured to the under surface of the free end portion 64 of the trap arm by engagement with the previously described fastening element 58 and it will be noted that the inner end edge of the plate is provided with a flanged portion 66 such as to abut the under surface of the arm and space the plate therefrom. Adjacent this end of the plate is provided a pair of projections 68 disposed on opposite side edges of the same and which pivotally receive the depending ear portions 70 of the combined latching and release member indicated generally by the reference character 72. These ear portions straddle the arm member 64 in the manner shown so as to be pivotally mounted in relation thereto.

The upper end of the J-shaped member 72 is provided with a nose portion 74 having an inclined upper surface 76 for cooperation with one of the jaw members 78 in a manner similar to that previously described, and the arcuate lower portion 80 of the member 72 is disposed in the path of movement of the cam projection 60 on the trip pan arm such that the manipulation of the trip pan will effect disengagement between the jaw and the member 72. The member 72 is also provided with the spring member 82 abutting against the free end portion 64 of the arm for the purpose previously described.

It is to be noted that the form of the invention shown in Figures 4 and 5 is most particularly adapted as an attachment for conventional traps and, operates, in effect, in the same manner as the complete assembly shown in Figures 1–3.

Since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. In an animal trap having a base provided with upstanding ears at its opposite ends, a pair of jaw members pivotally received between said ears, an arm projecting laterally from the approximate mid-portion of the base and having an upturned free end portion, said jaws being of generally U-shaped configuration with a portion of one of the jaws lying adjacent the free end portion of said laterally projecting arm when the trap jaws are disposed in set position, a spring member associated with said jaws for urging the same to a closed, animal trapping position, and trip mechanism including a pan positioned over the central portion of said base and a trip arm secured to said pan and pivotally secured adjacent the free end of said laterally projecting arm, said trip arm having a cam finger, an improved jaw latch and release mechanism comprising a mounting plate rigidly affixed to the under surface of said free end portion of the laterally projecting arm, said mounting plate having a projection on each of its opposite side edges, a generally J-shaped member comprising an arcuate lower end portion having a pair of depending ears straddling said laterally projecting arm and pivotally mounted on said projections, the upper end of said J-shaped member projecting above the said one of the jaws when the jaws are in set position and being provided with a horizontal latching nose, spring means secured to said J-shaped member and abutting said upturned free end portion of said laterally projecting arm for urging said J-shaped member in such a direction that its nose will overlie said one jaw and retain the same in set position, the arcuate lower end portion of said J-shaped member being in the path of movement of the said cam finger whereby depression of the pan will rotate said cam finger thereby rotating said J-shaped member in opposition to the spring means and release said one jaw.

2. In an animal trap having a base provided with upstanding ears at its opposite ends, a pair of jaw members pivotally received between said ears, an arm projecting laterally from the approximate mid-portion of the base and having an upturned free end portion, said jaws being of generally U-shaped configuration with a portion of one of the jaws lying adjacent the free end portion of said laterally projecting arm when the trap jaws are disposed in set position, a spring member associated with said jaws for urging the same to a closed, animal trapping position, and trip mechanism including a pan positioned over the central portion of said base and a trip arm secured to said pan and pivotally secured adjacent the free end of said laterally projecting arm, said trip arm having a cam finger, an improved jaw latch and release mechanism comprising a mounting plate rigidly affixed to the undersurface of said free end portion of the laterally projecting arm, said mounting plate having a projection on each of its opposite side edges, a generally J-shaped member comprising an arcuate lower end portion having a pair of depending ears straddling said laterally projecting arm and pivotally mounted on said projections, the upper end of said J-shaped member projecting above the said one of the jaws when the jaws are in set position and being provided with a horizontal latching nose, the upper edge of said nose being inclined such that said one jaw will deflect the J-shaped member during movement of the jaws to the set position and permit passage of said one jaw under said nose, spring means secured to said J-shaped member and abutting said upturned free end portion of said laterally projecting arm for urging said J-shaped member in such a direction that its nose will overlie said one jaw and retain the same in set position, the arcuate lower end portion of said J-shaped member being in the path of movement of said cam finger whereby depression of the pan will rotate said cam finger thereby rotating said J-shaped member in opposition to the spring means and release said one jaw.

References Cited in the file of this patent
UNITED STATES PATENTS

| 1,588,907 | Rancier | June 15, 1926 |
| 2,052,106 | Myklebust | Aug. 25, 1936 |

FOREIGN PATENTS

| 368,333 | Great Britain | Mar. 1, 1932 |
| 724,735 | France | Jan. 30, 1932 |